Patented June 14, 1927.

1,632,555

UNITED STATES PATENT OFFICE.

GEORGE E. MESSINGER, OF NEW YORK, N. Y.

COMPOSITION OF MATTER.

No Drawing.   Application filed October 22, 1923.   Serial No. 669,944.

The invention relates to a composition of matter for use in cleaning and polishing furniture and other painted and varnished surfaces and for burnishing metal, such as nickel, brass and copper trimming on furniture and the like.

The primary object is to provide an easily constructed and inexpensive composition which can be used to clean and polish finished wood and metal surfaces quickly and efficiently leaving a high polish and which will not develop smear or corrosive appearances after a few days following its use.

The composition is formed as a mixture resembling an emulsion and contains the following ingredients in substantially the proportions indicated.

Mineral oil, 30 fluid ounces; infusorial earth, 10 ounces; hydrochloric acid (37% solution), 6½ fluid ounces; methyl salicylate, ½ ounce; water sufficient to make up one gallon.

The mineral oil used is a petroleum product in the form of a thin, colorless oil. The infusorial earth and hydrochloric acid are of the usual commercial grades of these substances and the methyl salicylate is the usual pharmaceutical preparation.

In preparing the composition the hydrochloric acid solution is diluted in about one-half of the water and to the aciduated water is mixed first the infusorial earth after which the methyl salicylate is added. The balance of the water is then added, the composition thoroughly mixed and then bottled for the market.

If left standing for some time the oil has a tendency to separate from the flocculus body portion of the substance but the mixture is easily restored simply by shaking the bottle before using the contents. In use a few drops of the substance are received on a cloth and the surface to be cleaned is rubbed with the cloth so dampened. The cleaned surface may be rubbed dry and given a high brilliant polish by rubbing with a clean polishing cloth.

The composition apparently will keep indefinitely without deteriorating and leaves the treated surface clean and with its original lustre free of dirt, smears, or corrosive action and there is no evidence of any oily film left on the surface even though the composition contains oil as one of its ingredients. There is no resulting corrosive effect evident even on the metal surfaces despite the fact that an acid is used as one of the ingredients.

Having thus described my invention, I claim:

A composition of matter for use as a cleaning and polishing agent, comprising a mixture combined substantially in the following proportions in one gallon of the composition, mineral oil thirty fluid ounces, infusorial earth ten ounces, hydrochloric acid (37% solution) six and one-half fluid ounces, methyl salicylate one-half ounce and sufficient water to make up one gallon.

Signed at New York city, in the county of New York and State of New York, this 20th day of October, A. D. 1923.

GEORGE E. MESSINGER.